(12) United States Patent
Wey et al.

(10) Patent No.: US 10,587,939 B2
(45) Date of Patent: Mar. 10, 2020

(54) DYNAMIC CAPACITY ALLOCATION IN OPTICAL COMMUNICATION NETWORKS

(71) Applicant: ZTE Corporation, Shenzhen, Guangdong (CN)

(72) Inventors: Jun Shan Wey, Sammamish, WA (US); Junwen Zhang, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 3 days.

(21) Appl. No.: 15/974,396

(22) Filed: May 8, 2018

(65) Prior Publication Data

US 2018/0332373 A1    Nov. 15, 2018

Related U.S. Application Data

(60) Provisional application No. 62/503,929, filed on May 9, 2017.

(51) Int. Cl.
*H04Q 11/00* (2006.01)
*H04J 14/02* (2006.01)

(52) U.S. Cl.
CPC ...... *H04Q 11/0062* (2013.01); *H04J 14/0238* (2013.01); *H04Q 11/0067* (2013.01); *H04J 14/0282* (2013.01); *H04Q 2011/0064* (2013.01); *H04Q 2011/0083* (2013.01); *H04Q 2011/0096* (2013.01)

(58) Field of Classification Search
None
See application file for complete search history.

(56) References Cited

U.S. PATENT DOCUMENTS

| 9,007,897 B2* | 4/2015 | Klein | H04B 7/2656 370/229 |
| 2003/0095562 A1* | 5/2003 | Liu | H04L 47/10 370/442 |
| 2011/0116470 A1* | 5/2011 | Arora | H04W 36/0016 370/331 |
| 2013/0209091 A1* | 8/2013 | Mateosky | H04B 10/07953 398/26 |
| 2013/0232265 A1* | 9/2013 | Bourgart | H04J 14/0227 14/227 |
| 2014/0016586 A1* | 1/2014 | Khan | H04L 1/0003 370/329 |
| 2014/0178076 A1* | 6/2014 | Fang | H04J 14/0238 398/98 |

(Continued)

OTHER PUBLICATIONS

Qian, D., et al., "108 Gb/s OFDMA-PON With Polarization Multiplexing and Direct Detection," Journal of Lightwave Technology, 28(4):484-493, Feb. 2010.

*Primary Examiner* — Bunjob Jaroenchonwanit
(74) *Attorney, Agent, or Firm* — Perkins Coie LLP

(57) ABSTRACT

Techniques for efficiently utilize the available bandwidth in a communication network are described. One example implementation includes a method of optical communication including receiving bandwidth requests from multiple network devices in an optical network, receiving communication capability information about the multiple network devices, generating a transmission schedule that specifies transmissions in the optical network in multiple time slots with a corresponding modulation format, and transmitting and/or receiving data based on the transmission schedule.

12 Claims, 8 Drawing Sheets

(56) References Cited

U.S. PATENT DOCUMENTS

| | | | |
|---|---|---|---|
| 2014/0233950 A1* | 8/2014 | Luo | H04Q 11/0067 398/66 |
| 2014/0307662 A1* | 10/2014 | Zheng | H04W 24/10 370/329 |
| 2014/0314418 A1* | 10/2014 | Sun | H04B 10/27 398/89 |
| 2015/0326337 A1* | 11/2015 | Yoshida | H04L 12/44 398/48 |
| 2016/0315724 A1* | 10/2016 | Dou | H04L 27/2657 |
| 2018/0138972 A1* | 5/2018 | Shen | H04B 10/27 |
| 2018/0287681 A1* | 10/2018 | Chen | H04W 72/04 |
| 2018/0324604 A1* | 11/2018 | Yang | H04W 16/14 |
| 2019/0132044 A1* | 5/2019 | Hreha | H04B 7/18515 |
| 2019/0173582 A1* | 6/2019 | Ashrafi | H04B 10/40 |

* cited by examiner

US 10,587,939 B2

DYNAMIC CAPACITY ALLOCATION IN OPTICAL COMMUNICATION NETWORKS

CROSS REFERENCE TO RELATED APPLICATIONS

This patent document claims the benefit of priority of U.S. Provisional Patent Application No. 62/503,929, filed on May 9, 2017. The entire content of the before-mentioned patent application is incorporated by reference as part of the disclosure of this document.

TECHNICAL FIELD

This patent document relates to digital communication, and, in one aspect, optical communication systems.

BACKGROUND

There is an ever-growing demand for data communications in application areas such as wireless communications, fiber optic communications and so on. The demand on access networks is especially growing because not only are user devices such as smartphones and computers using more and more bandwidth due to multimedia applications, but also the total number of devices for which data is carried over the access networks is increasing. For profitability and to meet increasing demand, equipment manufacturers and network operators are continually looking for ways in which operational and capital expenditure can be reduced.

SUMMARY

The present document discloses techniques for dynamic bandwidth allocation in a communication system.

In one example aspect, a method of optical communication is disclosed. The method includes receiving bandwidth requests from multiple network devices in an optical network, receiving communication capability information about the multiple network devices, generating a transmission schedule that specifies transmissions in the optical network in multiple time slots with a corresponding modulation format, and transmitting and/or receiving data based on the transmission schedule.

In another example aspect, an optical communication apparatus is disclosed. The apparatus includes a processor that is configured to receive bandwidth requests from multiple network devices in an optical network, a receiver configured to receive communication capability information of the multiple network devices, a scheduler configured to generate a transmission schedule that specifies transmissions in the optical network in multiple time slots with a corresponding modulation format, and an elastic transceiver configure to transmit and/or receive data based on the transmission schedule.

In yet another example aspect, a method of wireless communication is disclosed. The method includes transmitting bandwidth requests to a controller in an optical network, providing communication capability information to the controller, receiving a transmission schedule that specifies transmissions in the optical network in multiple time slots with a corresponding modulation format, and transmitting and/or receiving data based on the transmission schedule.

These, and other aspects, are disclosed in the present document.

DETAILED DESCRIPTION

Figure 1:
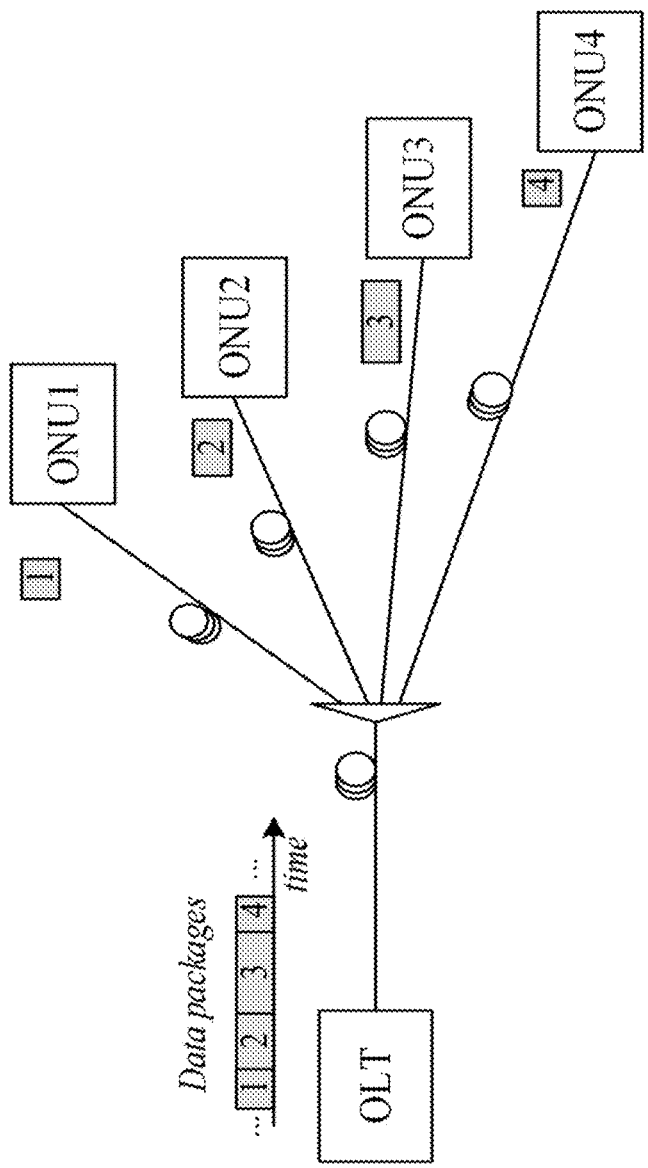
FIG. 1 is a block diagram of an example passive optical network.

As optical access networks continue to evolve to a more heterogeneous type of network supporting both fixed (FTTx) and wireless (mobile backhaul and fronthaul) services, it is expected that many different systems will coexist on the same passive optical network (PON). These systems and the devices operating in these systems often are communicating using different data rates which may change depending on the time of data and other operational conditions. It is, therefore, useful for an optical communication network to be able to quickly reconfigure the capacity for different systems with users at different locations.

In a traditional PON system, such situations are handled by various techniques, collectively called dynamic bandwidth allocation (DBA) mechanisms. However, traditional PON bandwidth allocation is based on allocation of capacity in a time-division multiplexed (TDM) manner. Using such schemes, different devices are allocated different transmission time durations and slots in sharing a communication bandwidth with each other. However, such bandwidth sharing based on time is limited in a heterogeneous network.

The techniques described in the present document can be used by various embodiments to provide an elastic capacity/bandwidth allocation method. Some embodiments may intelligently allocate capacity or bandwidth by dynamically configuring both time and modulation formats (e.g., more bits per symbol for higher spectral efficiency) of the transmitted signals. In some embodiments, such a method may be used for meeting the capacity demand for end users at widely distributed geographic locations.

Section headings are used in the present document to improve readability and do not limit the disclosed technology and embodiments to the respective sections.

For highlighting some aspects of bandwidth allocation, the following four use cases are used:

In a first use case, a location dependent data rate is provided where the network may provide a high aggregated capacity in urban area and a relatively lower aggregated capacity in rural areas where the number of users, and thus the amount of optical equipment, may be fewer and may be sparsely distributed.

In a second use case, a service dependent data rate provides backhauling or front hauling of multiple generations of wireless networks (3G, 4G, and/or 5G). The network allocates capacity based on the different system requirements.

In a third use case, an on-demand capacity allocation refers to network bandwidth that may be made available for special occasions such as major sports events, large concerts, political demonstrations, etc. To meet such a bandwidth demand, the network may be reconfigured to support the capacity increase in the duration of the events. This change in bandwidth allocation may be pre-planned or on demand.

In a fourth use case, small cells may be formed and taken down by users on an ad-hoc basis. Therefore, such a bandwidth allocation may be characterized by fast provisioning of high number of end users; each has different data rate requirements.

It is envisioned that in a heterogeneous network, not only do different users need different data rates (second use case), but the same user may have dynamic data rate requirements (first, third, and fourth use cases). The optical line terminal (OLT) at the central office (CO) can change the modulation format to achieve different data rates. As receiver sensitivity depends on modulation format used, the exact data rate a user (at the Optical Network Unit, ONU) can receive will depend on its distance to the OLT.

Examples of Upstream and Downstream Embodiments

This section provides some examples of the transceiver technology that can be used to implement the elastic bandwidth allocation mechanism described in this document.

In some embodiments, a transceiver may be flexibly sending mixed modulation formats (NRZ, Duobinary, PAMn, mQAM) or data rates (1 G, 25 G, 50 G, 100 G, or other rates) depending on ONUs' locations and capacity use.

For example, in some embodiments, in the downstream (DS) direction, each TDM frame may be transmitted using its own modulation format and symbol rate such that the modulation format and symbol rate used in one time slot may change from those used in a next time slot. For compatibility, some embodiments of OLTs may be able to communicate with both legacy ONUs and elastic ONUs at the same time.

Within a TDM frame, a transmission may include multiple symbols. Each symbol may contain different modulation format such as PAM-2, PAM-4, PAM-8, PAM-16, QPSK, 4-QAM, 8-QAM, 16 QAM, 32, QAM, 64, QAM, etc. An ONU may have a receiver (or transmitter) that is flexible or elastic to be able to receive (or transmit) differing modulation formats.

In the upstream (US) direction, an OLT receiver implementation may detect bursts from both legacy and elastic ONUs. An ONU burst header may include an identifier to tell the OLT about the modulation format being used by that transmission. Such OLT receivers may implement Digital Signal Processing (DSP) and equalize input signals from ONUs with different modulation formats and symbol rates.

The transmission and reception may be performed according to a dynamic bandwidth allocation algorithm implementation, as described in the present document.

Examples of supported combinations of data rates and modulation formats using a single wavelength include 1 G NRZ (non-return to zero), 10 G NRZ, and 25 G NRZ. Additional examples include 25 G rate using new modulation formats, e.g., 25 G PAM4 (12.5 G symbol rate) or 25 G 16 QAM (12.5 G symbol rate); 50 G new modulation formats; 50 G PAM4 (25 symbol rate); 50 G 16 QAM (25 G symbol rate); 50 G 64 QAM (8.33 G symbol rate); and 100 G new modulation formats; 100 G PAM4 (50 G symbol rate); 100 G PAM16 (25 G symbol rate); and 100 G 64 QAM (50 G symbol rate).

In some embodiments, the bandwidth allocation procedures may be managed by a network coordinator, e.g., a software-defined network (SDN) orchestrator that is located in Cloud. In one aspect, the dynamically provisioned available bandwidth to different users is treated as a two dimensional resource (time as one dimension and bits per symbol as the other dimension), compared with legacy systems with only time as the resource. In another aspect, the disclosed embodiments can use all of the available bandwidth. For example, for communication with ONUs with lower path loss and/or more sensitive receivers, the bandwidth allocation procedure may allocate higher-level modulation formats to increase the total capacity.

FIG. 1 shows an example of a conventional TDD optical network. For such a legacy PON, e.g., GPON, EPON, XG(S)-PON, and NG-PON2, with NRZ-OOK modulation format, time resource is the only dimension for DBA for both downstream (DS) and upstream (US) directions. By changing the allocated time window for each ONU, the centralized OLT can dynamically change the DS/US bandwidth among different ONUs. This is depicted based on the width of the data package along the horizontal (time) axis. For example, in the depicted allocation, DS bandwidth to ONU 3 is the largest, followed by DS bandwidth allocated to ONU 2, followed by equal bandwidth allocated to ONUs 1 and 4.

In some embodiments of PON systems using advanced modulation formats, e.g., PAM-4/8/16 and DMT/QAM-4/8/16/32/64, there is a possibility of coexistence of signals using these modulation formats with basic NRZ-OOK signals. In general, advanced modulation formats require higher received optical power. ONUs at a shorter distance to OLT experiences lower path loss, thus higher received power. As such, these ONUs can support higher level modulation formats with higher spectral efficiency. Other operational factors may also influence the highest level modulation that can be achieved between an OLT and an ONU. These include quality of the optical transmission medium, technology used in implementing the OLT and the ONU, and so on.

In a system with flexible modulation formats, an ONU may be capable of sending mixed modulation formats (NRZ, Duobinary, PAMn, or mQAM) depending on its location (path loss). The OLT may collect all the information about each ONU, including the path loss, maximum bits per symbol supported, and both US/DS bandwidth demands. It can then create a two-dimensional bandwidth map (BW map) for each ONU based on the information collected.

Figure 2:
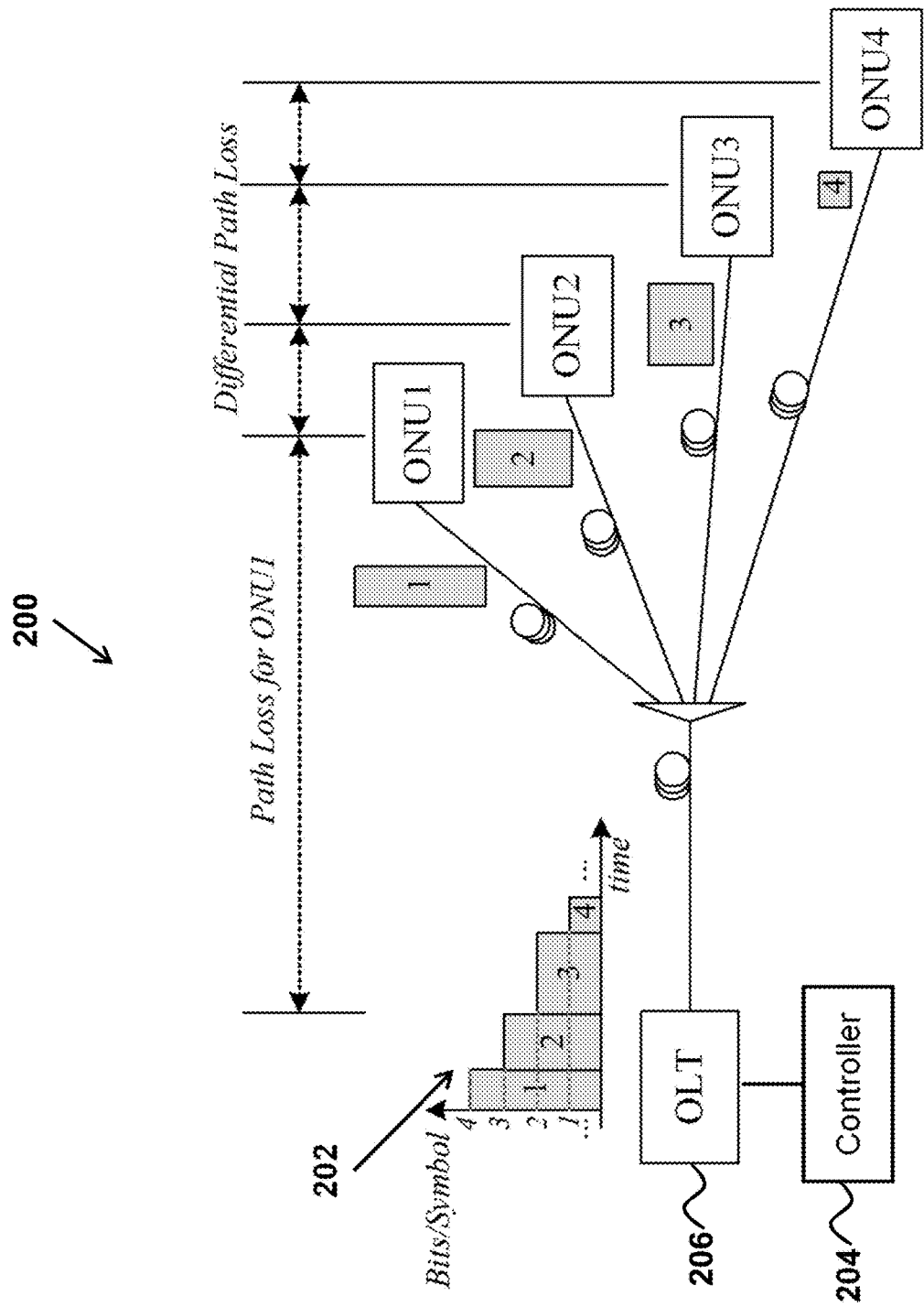
FIG. 2 is a block diagram depicting an example embodiment of a two-dimensional dynamic bandwidth allocation scheme.

FIG. 2 shows an example optical network 200 of elastic OLT/ONUs with flexible modulation formats. In such a system, the OLT 206 can dynamically change the bandwidth of each ONU in two dimensions—time and the number of bits per symbol. A controller 204, either co-located with the OLT, or somewhere else in the network, may be used to perform at least some of the bandwidth allocation functions as described herein. The distances between ONUn (where n=1, 2, 3, . . . ) and the OLT have the relationship of D1<D2<D3<D4 and ONUn supports 4, 3, 2, or 1 bit(s) per symbol, respectively. In this way, the bandwidth allocation scheme can be realized in two dimensions—time slots and bits per symbol. A visual depiction is shown in graph 202. The total area occupied by the rectangles 1, 2, 3, and 4 is indicative of total number of bits transmitted in the optical network 200. Furthermore, area of each rectangle 1 to 4 is approximately proportional to the bandwidth of the communication with the corresponding ONU. As can be seen, communication with ONU1 occurs at the highest number of bits per symbol and with a corresponding time slot allocated for transmission to ONU1 that is shorter than the other time slots. However, the number of bits communicated during the time slot for ONU1 may be more than time slots 2, 3 or 4 because the number of bits per symbol increases the number of bits communicated more than the smaller time slot reduces the number of bits communicated.

Figure 3:
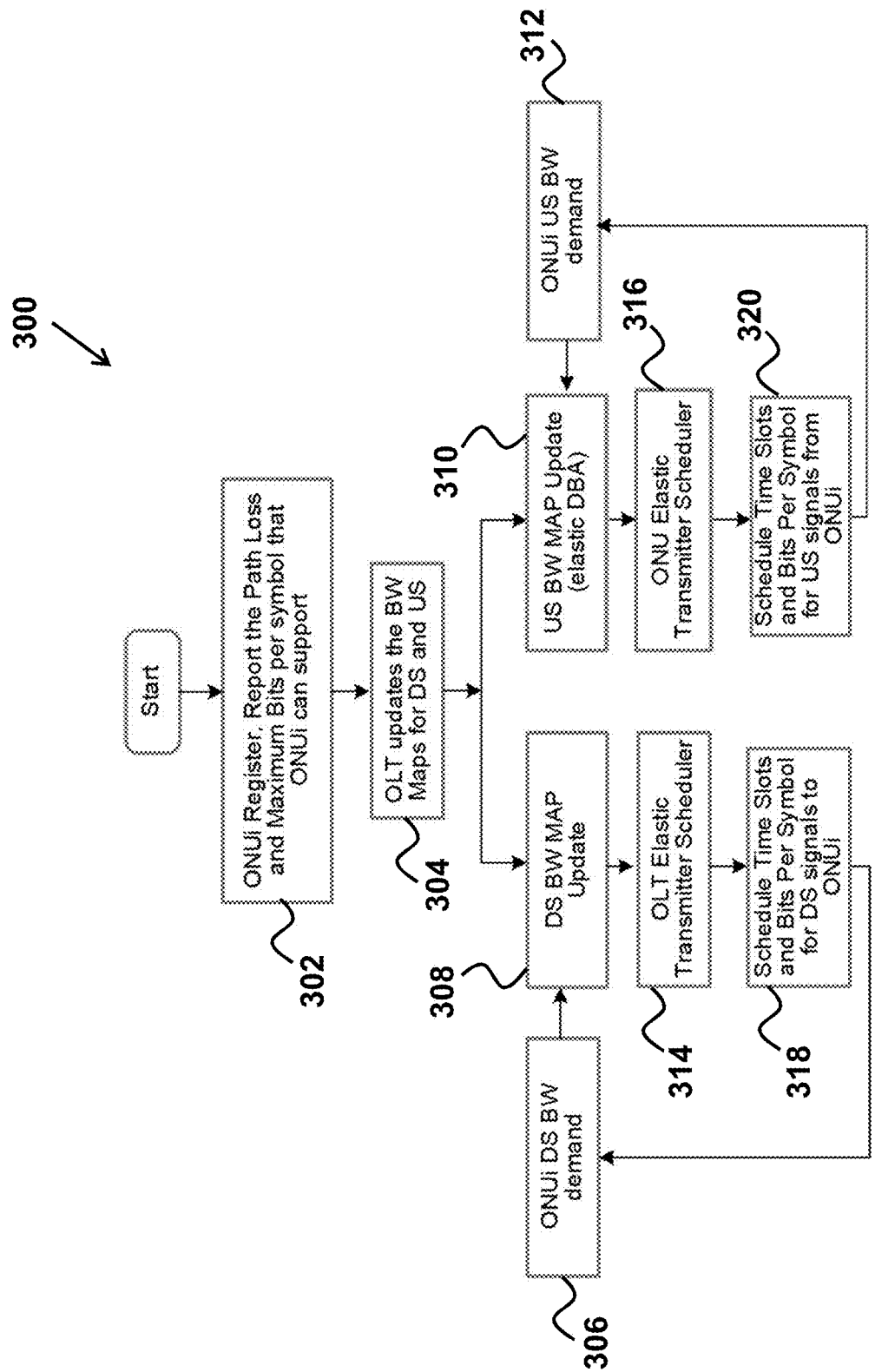
FIG. 3 is a flowchart representation of an example method of dynamic upstream and downstream bandwidth allocation.

FIG. 3 shows an example of a BW map creation and an updating process 300 for both DS and US. For DS, the OLT sends data to different ONUs, depending on the demand, the time resource, and the supported bits per symbol. For US, the elastic DBA (eDBA) function provides input to the OLT US scheduler, which is also responsible for generating the BW maps. The process 300 may include operation 302 in which each ONU registers with the network, reports the path loss being seen by the ONU and further reports the maximum modulation format that the ONU can support. Using this information, at operation 304, the OLT updates a local bandwidth map for US and DS data transmissions in the network.

From time to time, the OLT may update (308) DS bandwidth map. When the update is performed, the OLT may use the updated bandwidth map for scheduling (314) further DS transmissions in the network. This may be performed by scheduling (318) time slots and bits per symbol according to bandwidth need. Further, when an ONU decides (306) that it has a need for additional bandwidth, and issues the demand to the OLT, the OLT may perform another update (308) to the downstream map.

For US data transmissions, a bandwidth map update may be performed at 310. This operation may be triggered by a demand from an ONU for additional US bandwidth. Based on the request, a transmission scheduler may schedule (316) US transmissions based on time slot width and the modulation format to meet the bandwidth requirement of each device (320).

Figure 4:
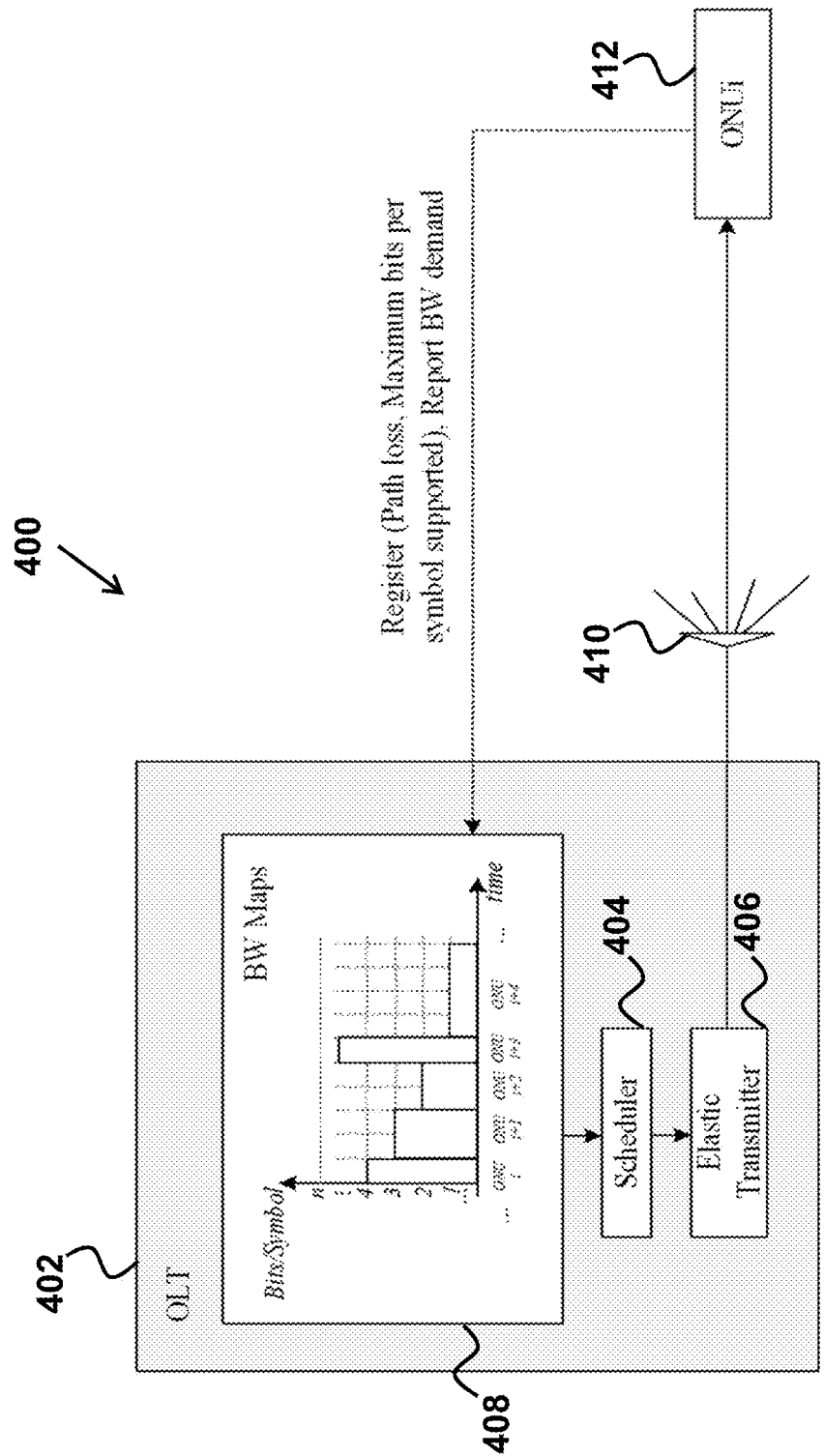
FIG. 4 is a block diagram of an example implementation of a downstream bandwidth allocation technique.
Figure 5:
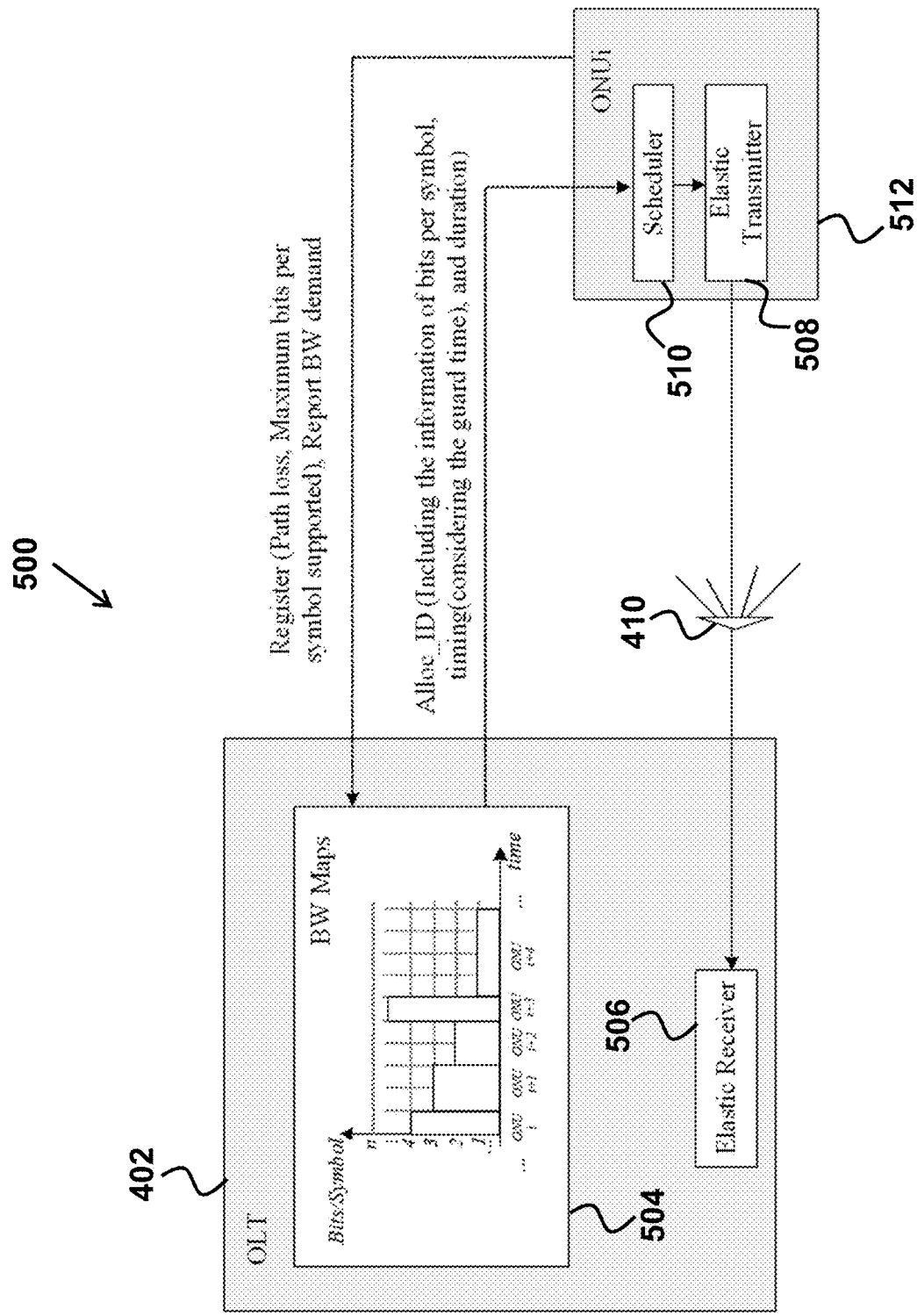
FIG. 5 is a block diagram of an example implementation of an upstream bandwidth allocation technique.

Different algorithms can be used for bandwidth allocation including for the US DBA. FIGS. 4 and 5 depict creation of a BW map for DS and US. The OLT stores the BW maps and updates them during registration and through requests from ONUs. For DS, the OLT sends the data to different ONUs by scheduling the time slots and modulation formats. For US, the eDBA function then provides input to the OLT US scheduler as an Alloc_ID, which specifies the timing (considering the guard time between bursts), duration length and the bits per symbol of the upstream transmission from the ONUs.

FIG. 4 depicts an optical network 400 in which the OLT 402 includes a scheduler 404 and an elastic transmitter 406. The scheduler 404 uses a locally stored bandwidth allocation map 408 that the scheduler 404 uses to dynamically allocate downstream bandwidth to multiple ONUs 412. The elastic transmitter 406 performs data modulation according to the modulation format and time slot duration specified by the scheduler 404. Accordingly, the elastic transmitter 406 can elastically and dynamically change the modulation format and constellation density of the DS signal, possibly on a symbol by symbol basis. The optical transmitter 410 converts electrical signals into modulated optical signals using an electrical to optical conversion technology.

In some embodiments, the scheduler 404 may allocate bandwidth based on current requests from an ONU such that the allocated bandwidth meets the demand over a number of transmission maps. For example, for the sake of illustration, it is assumed that the rectangle allocated to ONUi at 4 bits/symbol represents 200 bits of data being transmitted during the time slot (50 symbols×4 bits/symbol). For the sake of illustration, if it is assumed that bandwidth requirement of ONUi changes from 200 bits per transmission frame to 240 bits per transmission frame. The scheduler may be able to accommodate the increased bandwidth requirement by scheduling longer time slots (60 symbols×4 bits/symbol).

However, in some cases, the scheduler may not be able to increase the time allocated to ONUi due to other competing demands on the bandwidth (e.g., by other ONUs). In such a case, the scheduler may provide bandwidth allocation to ONUi which is "on the average" 240 bits per transmission frame. This may be accomplished by providing opportunistically different bandwidth over multiple transmission frames such that the average is about 240 bits per transmission frames. For example, over five transmission frames, the allocated bandwidth may be 200 bits, 300 bits, 300 bits, 200 bits, 200 bits, averaging to 240 bits. Furthermore, when averaging over multiple transmission frames, the number of transmission frames over which a target average bitrate is achieved may depend on the latency tolerance of the corresponding ONU. For example, an ONU that is able to tolerate relatively higher data latency may be allocated bandwidth by averaging over a greater number of transmission maps.

In some embodiments, the scheduler may perform the optimization by associating implicit or explicit priorities with the bandwidth requests from various ONUs. The priority may be based on a priority field in the bandwidth request, or may be based on another rule such as round robin allocation, and so on.

FIG. 5 depicts an optical network 500 in which dynamic scheduling is used for US data transmissions received at the OLT 402. The OLT 402 controls the US data transmission formats and durations using a locally stored bandwidth map 504. The OLT 402 includes an elastic receiver 506 that receives signal transmissions from the multiple ONUs 512 at specified modulations on a symbol by symbol basis. Each ONU 512 may include a scheduler 510 that receives scheduling information from the OLT 402 and controls an elastic transmitter 508 accordingly to transmit US data. The scheduling information may include information about duration of time slot, value of guard time, and the modulation to be used on a symbol by symbol basis. The ONU 512 may also communicate with the OLT 402 to inform the OLT 402 of its operational conditions such as path loss being currently seen, its transmission/reception capabilities in terms of the types of modulation schemes supported and its upstream bandwidth requirements from time to time.

While in FIG. 4 and FIG. 5, each ONU is shown to have a single time slot, in some embodiments, an ONU may be allocated multiple time slots that may be set apart from each other. Such may be the case, e.g., when the ONU has a need for very low latency data transmission and the ONU may not tolerate waiting for an additional transmission frame.

Figure 6:
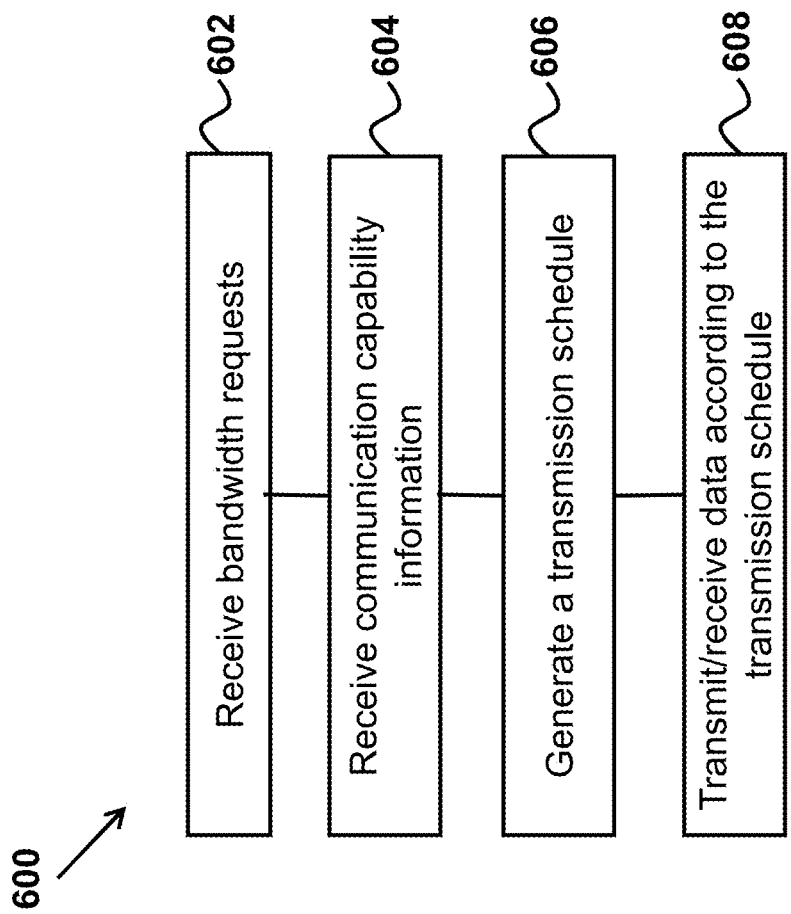
FIG. 6 is a flowchart for an example method of optical communication.

FIG. 6 is a flowchart for a method 600 of optical communication. The method 600 includes receiving (602) bandwidth requests from multiple network devices in an optical network, receiving (604) communication capability information of the multiple network devices, generating (606) a transmission schedule that specifies transmissions in the optical network in multiple time slots with a corresponding modulation format, and transmitting (608) and/or receiving data based on the transmission schedule.

As described with respect to FIGS. 2 to 5, in some embodiments, the method 600 may be implemented in an optical network in which transmissions are organized as transmission frames comprising a number of time slots, where the transmission schedule specifies transmission in an integer number of transmission frames. For example, in some embodiments, one transmission schedule may be used per transmission frame, while in some other embodiments, one transmission schedule may be used to specify transmissions in N (N is a positive integer greater than 1) transmission frames.

In some embodiments, the transmission schedule may be generated by designating a particular time slot for a downstream transmission to a network device (e.g., ONU), and selecting modulation formats for the particular time slot based on the bandwidth requested by the network device and communication capability of the network device. For example, the maximum modulation scheme supported by the network device may be used as an upper limit on the modulation format scheduled in the transmission schedule. A similar transmission schedule may also be generated for upstream transmissions.

The transmission capability of a device may be received during the process of registering the device when it enters the optical network. Alternatively or additionally, the communication capability information may be requested and/or received on a periodic basis during the operation of the network.

Figure 7:
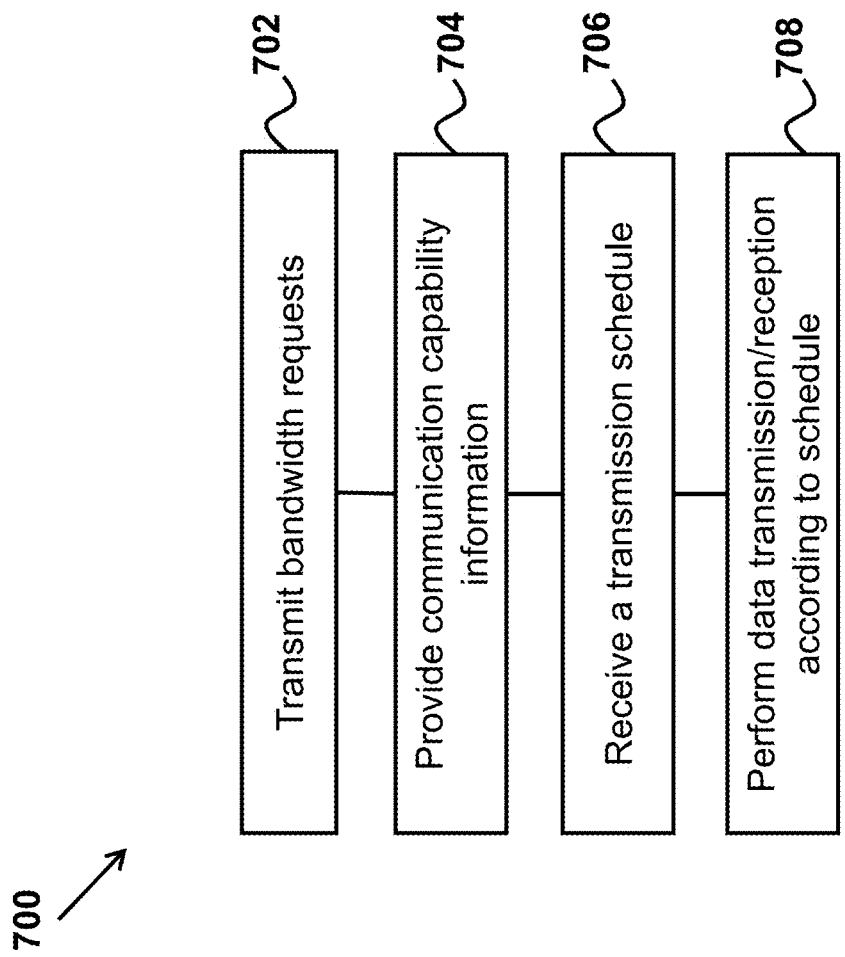
FIG. 7 is a block diagram of an example implementation of an optical transmission apparatus.
Figure 8:
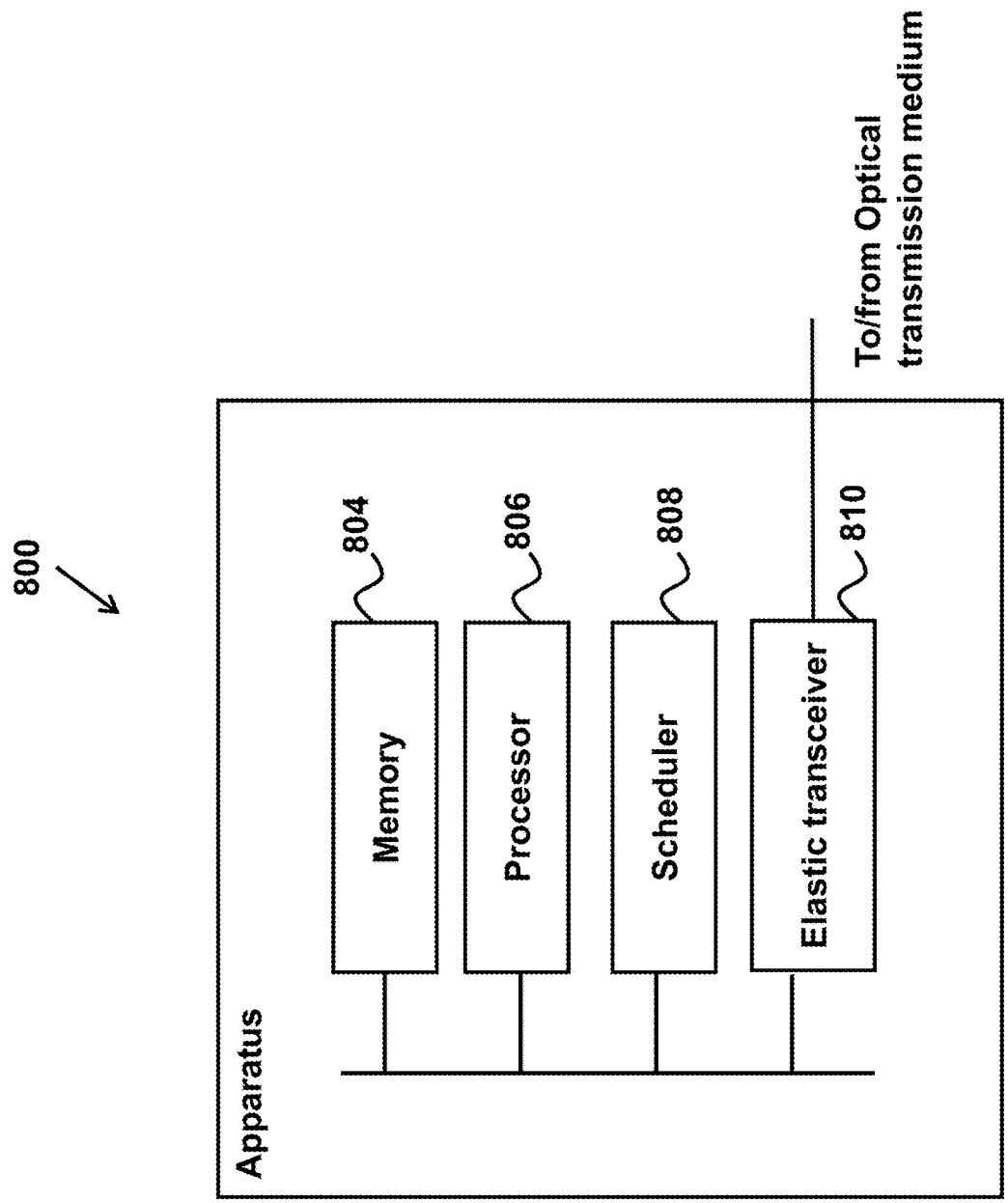
FIG. 8 shows an example of an optical communications apparatus.

FIG. 7 is a flowchart for a method 700 of optical communication. The method 700 includes transmitting (702) bandwidth requests to a controller in an optical network, providing (704) communication capability information to the controller, receiving (706) a transmission schedule that specifies transmissions in the optical network in multiple time slots with a corresponding modulation format, and transmitting and/or receiving (708) data based on the transmission schedule. The controller may be, for example, the controller 204, which may be co-located with an OLT in the optical network or may be implemented on another computer in the cloud. FIG. 8 shows an example of an optical communication apparatus 800 comprising a memory 804, a processor 806, a scheduler 808, and an elastic transceiver 810. In some embodiments, the scheduler 808 may include a computational part that generates a schedule and a storage part that stores information such as current bandwidth requests, maximum modulation capability of each ONU, current bandwidth map, and so on. The apparatus 800 may be configured to implement method 600 and/or method 700.

It will be appreciated that techniques are disclosed for dynamically allocating bandwidth in a TDD optical network such that bandwidth use is optimized in a two dimensional resource plane—one dimension being transmission time, and the other dimension being the modulation format. In addition, in some embodiments, a third dimension of optimization may also be used. This dimension may be a long term time average of the allocated bandwidth to a specific ONU, such that over a period of time, a given target average bandwidth is allocated to the ONU.

The disclosed and other embodiments, modules, and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatuses.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating an output. The processes and logic flows can also be performed by, and an apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, comprising:
   receiving bandwidth requests for a first transmission frame from multiple network devices including a first network device in an optical network;
   receiving communication capability information about the multiple network devices including modulation capabilities for each of the multiple network devices including the first network device;
   generating a transmission schedule associating the first network device with one or more time slots and a modulation format, wherein a symbol rate and the modulation format are selected based on the received bandwidth request from the first network device and a modulation capability of the first network device, wherein the symbol rate and the modulation format are dynamically selected for the first network device for each time slot, and wherein the other of the multiple network devices each have an assigned symbol rate and an assigned modulation format dynamically selected according to each network device's modulation capability and bandwidth request; and
   transmitting or receiving data based on the transmission schedule.

2. The method of claim 1, wherein the generating the transmission schedule includes:
   designating a particular time slot for a downstream transmission to the first network device; and
   selecting the modulation format for the particular time slot based on the bandwidth requested by the first network device and the communication capability information about the first network device.

3. The method of claim 1, further including:
   designating a particular time slot for an upstream transmission from the first network device; and
   selecting the modulation format for the particular time slot based on the bandwidth requested by the first network device and the communication capability information about the first network device.

4. The method of claim 1, wherein new bandwidth requests are received for each transmission frame after the first transmission frame.

5. The method of claim 1, wherein the received communication capability information including the modulation capabilities apply to upstream and/or downstream modulation capabilities.

6. The method of claim 5, wherein the communication capability information for the first network device is received while registering the first network device with the optical network.

7. An optical communication apparatus, comprising:
   a processor configured to receive bandwidth requests for a first transmission frame from multiple network devices including a first network device in an optical network;
   a receiver configured to receive communication capability information about the multiple network devices including modulation capabilities for each of the multiple network devices including the first network device;
   a scheduler configured to generate a transmission schedule associating the first network device with one or more time slots and a modulation format, wherein a symbol rate and the modulation format are selected based on the received bandwidth request from the first network device and a modulation capability of the first network device, wherein the symbol rate and the modulation format are dynamically selected for the first network device for each time slot, and wherein the other of the multiple network devices each have an assigned symbol rate and an assigned modulation format dynamically selected according to each network device's modulation capability and bandwidth request; and
   a transceiver configured to transmit or receive data based on the transmission schedule.

8. The apparatus of claim 7, wherein the scheduler is configured to generate the transmission schedule by:
   designating a particular time slot for a downstream transmission to the first network device; and
   selecting the modulation format for the particular time slot based on the bandwidth requested by the first network device and the communication capability information about the network device.

9. An optical communication apparatus comprising a processor configured to perform at least:
   receiving bandwidth requests for a first transmission frame from multiple network devices including a first network device in an optical network;
   receiving communication capability information about the multiple network devices including modulation capabilities for each of the multiple network devices including the first network device;
   generating a transmission schedule associating the first network device with one or more time slots and a modulation format, wherein a symbol rate and the modulation format are selected based on the received bandwidth request from the first network device and a modulation capability of the first network device, wherein the symbol rate and the modulation format are dynamically selected for the first network device for each time slot, and wherein the other of the multiple network devices each have an assigned symbol rate and an assigned modulation format dynamically selected according to each network device's modulation capability and bandwidth request; and
   transmitting or receiving data based on the transmission schedule.

10. The apparatus of claim 9, wherein the receiving the transmission schedule includes:
    receiving information that a particular time slot is designated for a downstream transmission; and
    operating an optical receiver using the modulation format for the particular time slot to receive a transmission during the particular time slot.

11. A computer program product comprising a computer readable medium having code stored thereupon, the code, when executed by a processor, causing the processor to perform:

receiving bandwidth requests for a first transmission frame from multiple network devices including a first network device in an optical network;

receiving communication capability information about the multiple network devices including modulation capabilities for each of the multiple network devices including the first network device;

generating a transmission schedule associating the first network device with one or more time slots and a modulation format, wherein a symbol rate and the modulation format are selected based on the received bandwidth request from the first network device and a modulation capability of the first network device, wherein the symbol rate and the modulation format are dynamically selected for the first network device for each time slot, and wherein the other of the multiple network devices each have an assigned symbol rate and an assigned modulation format dynamically selected according to each network device's modulation capability and bandwidth request; and transmitting or receiving data based on the transmission schedule.

12. The computer program product of claim 11, wherein the code further causes the processor to perform:

designating a particular time slot for an upstream transmission from a network device; and selecting the modulation format for the particular time slot based on the bandwidth requested by the network device and/or the communication capability information about the network device.

* * * * *